United States Patent
Inagaki et al.

(10) Patent No.: US 10,960,549 B2
(45) Date of Patent: Mar. 30, 2021

(54) VIBRATION ANALYZER AND VIBRATION ANALYSIS METHOD

(71) Applicant: Fanuc Corporation, Yamanashi (JP)

(72) Inventors: Satoshi Inagaki, Yamanashi (JP); Hajime Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 90 days.

(21) Appl. No.: 16/268,114

(22) Filed: Feb. 5, 2019

(65) Prior Publication Data
US 2019/0255709 A1   Aug. 22, 2019

(30) Foreign Application Priority Data
Feb. 22, 2018   (JP) .............................. JP2018-029672

(51) Int. Cl.
*B25J 9/16* (2006.01)
*B25J 19/02* (2006.01)
*G01H 1/00* (2006.01)

(52) U.S. Cl.
CPC ........... *B25J 9/1694* (2013.01); *B25J 9/1641* (2013.01); *B25J 19/02* (2013.01); *G01H 1/00* (2013.01);
(Continued)

(58) Field of Classification Search
CPC ...... B25J 9/1694; B25J 9/1692; B25J 9/1641; B25J 9/1605; B25J 9/1612; B25J 9/1638; B25J 9/1651; B25J 9/1653; B25J 13/088; B25J 19/0095; G01H 1/00; G01H 17/00; G05B 2219/37388; G05B 2219/39195; G05B 2219/40549; G05B 2219/37434; G05B 2219/37435; G05B 2219/39199; G05B 2219/39241
See application file for complete search history.

(56) References Cited

U.S. PATENT DOCUMENTS

| | | | |
|---|---|---|---|
| 2001/0033146 A1 | 10/2001 | Kato et al. | |
| 2007/0001638 A1* | 1/2007 | Gray | ...................... B25J 9/1692 |
| | | | 318/568.11 |

(Continued)

FOREIGN PATENT DOCUMENTS

| | | |
|---|---|---|
| EP | 1132790 A1 | 9/2001 |
| JP | S62-024989 A | 2/1987 |

(Continued)

OTHER PUBLICATIONS

Ishikawa, Kaoru; Notice of Reasons for Refusal for Japanese Patent Application No. 2018-029672; dated Jan. 28, 2020; 4 pages.

(Continued)

*Primary Examiner* — Spencer D Patton
(74) *Attorney, Agent, or Firm* — Shackelford, Bowen, McKinley & Norton, LLP (57) ABSTRACT

A vibration analyzer includes a sensor that measures a vibration of an end effector supported by a distal end of a robot, a storage unit that stores a vibration calculation model of the robot, and a control unit configured to perform separation processing for separating a vibration to be reduced that is measured by the sensor into vibration data of the robot and vibration data of the end effector by using the vibration calculation model of the robot.

7 Claims, 8 Drawing Sheets

(52) U.S. Cl.
  CPC .............. *G05B 2219/39195* (2013.01); *G05B 2219/40549* (2013.01)

(56) References Cited

U.S. PATENT DOCUMENTS

| | | |
|---|---|---|
| 2011/0208356 A1 | 8/2011 | Kato et al. |
| 2015/0039128 A1* | 2/2015 | Oaki .................... B25J 9/1641 700/253 |
| 2016/0096271 A1 | 4/2016 | Taylor et al. |

FOREIGN PATENT DOCUMENTS

| | | |
|---|---|---|
| JP | H06-278080 A | 10/1994 |
| JP | 2001-293638 A | 10/2001 |
| JP | 2005-103649 A | 4/2005 |
| JP | 2005-211993 A | 8/2005 |
| JP | 2011-167817 A | 9/2011 |
| JP | 4850956 B2 | 1/2012 |
| JP | 2013-188859 A | 9/2013 |
| JP | 2018-001370 A | 1/2018 |

OTHER PUBLICATIONS

Industrial Property Cooperation Center; Search Report by Registered Search Organization for Japanese Patent Application No. 2018-029672; 8 pages.

* cited by examiner

VIBRATION ANALYZER AND VIBRATION ANALYSIS METHOD

CROSS-REFERENCE TO RELATED APPLICATIONS

This application is based on and claims priority to Japanese Patent Application No. 2018-029672 filed on Feb. 22, 2018, the entire content of which is incorporated herein by reference.

TECHNICAL FIELD

The present invention relates to a vibration analyzer and a vibration analysis method.

BACKGROUND ART

High-speed operation of a robot contributes to shortening of takt time and improvement of production efficiency. Meanwhile, when the robot performs the high-speed operation, vibrations may occur at the distal end of the robot depending on the stiffness of a robot arm, a reducer, and etc.

According to a traditionally known method for reducing vibration of a robot, vibrations at a predetermined location of a robot while the robot is being operated are measured by an acceleration sensor and the result of the measurement is used in learning control to reduce the vibrations of the robot (for example, see PTL 1).

CITATION LIST

Patent Literature

{PTL 1}
Japanese Unexamined Patent Application, Publication No. 2011-167817

SUMMARY OF INVENTION

A vibration analyzer according to a first aspect of the present invention includes a sensor configured to measure a vibration of an end effector supported by a distal end of a robot; a storage unit configured to store a vibration calculation model of the robot; and a control unit configured to perform separation processing for separating vibration to be reduced that is measured by the sensor into vibration data of the robot and vibration data of the end effector by using the vibration calculation model of the robot.

A vibration analyzer according to a second aspect of the present invention includes a sensor configured to measure a vibration of a robot; a storage unit configured to store a vibration calculation model of an end effector supported by a distal end of the robot; and a control unit configured to perform separation processing for obtaining vibration data of the robot and vibration data of the end effector by performing calculation based on vibration to be reduced that is measured by the sensor by using the vibration calculation model of the end effector.

A vibration analyzer according to a third aspect of the present invention includes a storage unit configured to store a vibration calculation model of a robot and a vibration calculation model of an end effector supported by the robot; and a control unit, wherein the robot and the end effector causing various vibrations when arrangement of the end effector to a predetermined location is performed depending on operation of the robot prior to the arrangement, the control unit is configured to perform vibration calculation processing for calculating vibration data of the robot and vibration data of the end effector for each of the various vibrations by using the vibration calculation model of the robot and the vibration calculation model of the end effector and operation program setting processing for setting or resetting an operation program of the robot for performing the arrangement by using at least one of a vibration of the robot and a vibration of the end effector.

A fourth aspect of the present invention provides a vibration analysis method for analyzing, by a control unit, a vibration of an end effector supported by a distal end of a robot actually measured by a sensor that measures the vibration. The vibration analysis method includes performing, by the control unit, separation processing for separating the vibration to be reduced that is measured by the sensor into vibration data of the robot and vibration data of the end effector by using a vibration calculation model of the robot stored in a storage unit.

A fifth aspect of the present invention provides a vibration analysis method for analyzing, by a control unit, a vibration of a robot actually measured by a sensor that measures the vibration, the robot being provided with an end effector, the method comprising: performing, by the control unit, separation processing for obtaining vibration data of the robot and vibration data of the end effector by performing calculation based on the vibration to be reduced that is measured by the sensor by using the vibration calculation model of the end effector stored in a storage unit.

A sixth aspect of the present invention provides a vibration analysis method for analyzing, by a control unit, a vibration of a robot and an end effector supported by the robot, the robot and the end effector causing various vibrations when arrangement of the end effector to a predetermined location is performed depending on operation of the robot prior to the arrangement, the method comprising: performing, by the control unit, vibration calculation processing for calculating vibration data of the robot and vibration data of the end effector for each of the various vibrations by using a vibration calculation model of the robot and a vibration calculation model of the end effector, and performing, by the control unit, operation program setting processing for setting or resetting an operation program of the robot for performing the arrangement by using at least one of the vibration data of the robot and the vibration data of the end effector.

DESCRIPTION OF EMBODIMENTS

A vibration analyzer according to a first embodiment of the present invention is described below with reference to the drawings.

Figure 1:
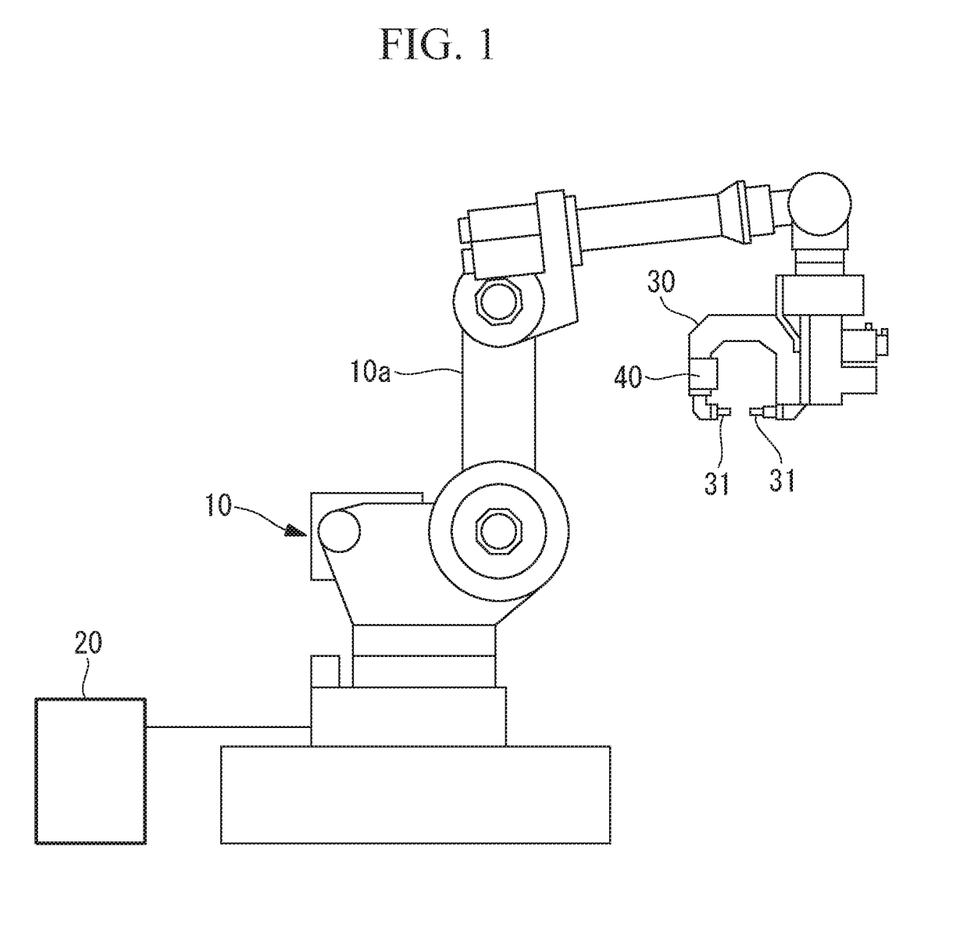
FIG. 1 is a schematic configuration diagram of a vibration analyzer according to a first embodiment of the present invention.

The vibration analyzer of this embodiment includes, as illustrated in FIG. 1, an acceleration sensor 40 provided in the vicinity of a working unit 31 of an end effector 30 and a control unit 20 configured to analyze vibrations actually measured by the acceleration sensor 40. The end effector 30 is attached to a distal end of a robot 10. In other words, the end effector 30 is supported by the robot 10.

The acceleration sensor 40 is a sensor configured for detection of vibration of the working unit 31 of the end effector 30. Gyro sensors, inertia sensors, or other sensors can be used as a sensor of this kind provided in the vicinity of the working unit 31. Also, as a sensor of this kind, a force sensor that detects inertial force acting upon the end effector 30 can be used. Also, it is also possible to use as the sensor of this kind a vision system that visually detects vibrations of the working unit 31. It is also possible to use a laser tracker, a motion capture, etc. that detect the vibrations of the working unit 31 in a non-contact manner. It should be noted that the working unit 31 is a section that is brought into contact with or placed near a not-shown workpiece to carry out predetermined machining on the workpiece.

The robot 10 includes an arm 10a as a movable unit. The arm 10a has a plurality of arm members and a plurality of joints. Also, the arm 10a includes a plurality of servo motors 11 each configured to drive a corresponding one of the joints (see FIG. 2). Various servo motors such as rotary motor and linear motor can be used as the servo motor 11. The servo motors 11 each have an operation position detection device for detection of operation position of the servo motor 11 and operation speed thereof. The operation position detection device is, for instance, an encoder. Detected values that have been detected by the operation position detection device are transmitted to the control unit 20.

Well-known end effectors can be used as the end effector 30. The end effector 30 may be, for example, a servo gun for welding, a hand, and various types of processing tools. The end effector 30 may be any other tool adapted to perform a predetermined task on the workpiece, a machine, and the like.

While the acceleration sensor 40 is provided in the vicinity of the working unit 31 of the end effector 30 in this embodiment, the acceleration sensor 40 may be provided at any other portion of the end effector 30.

Figure 2:
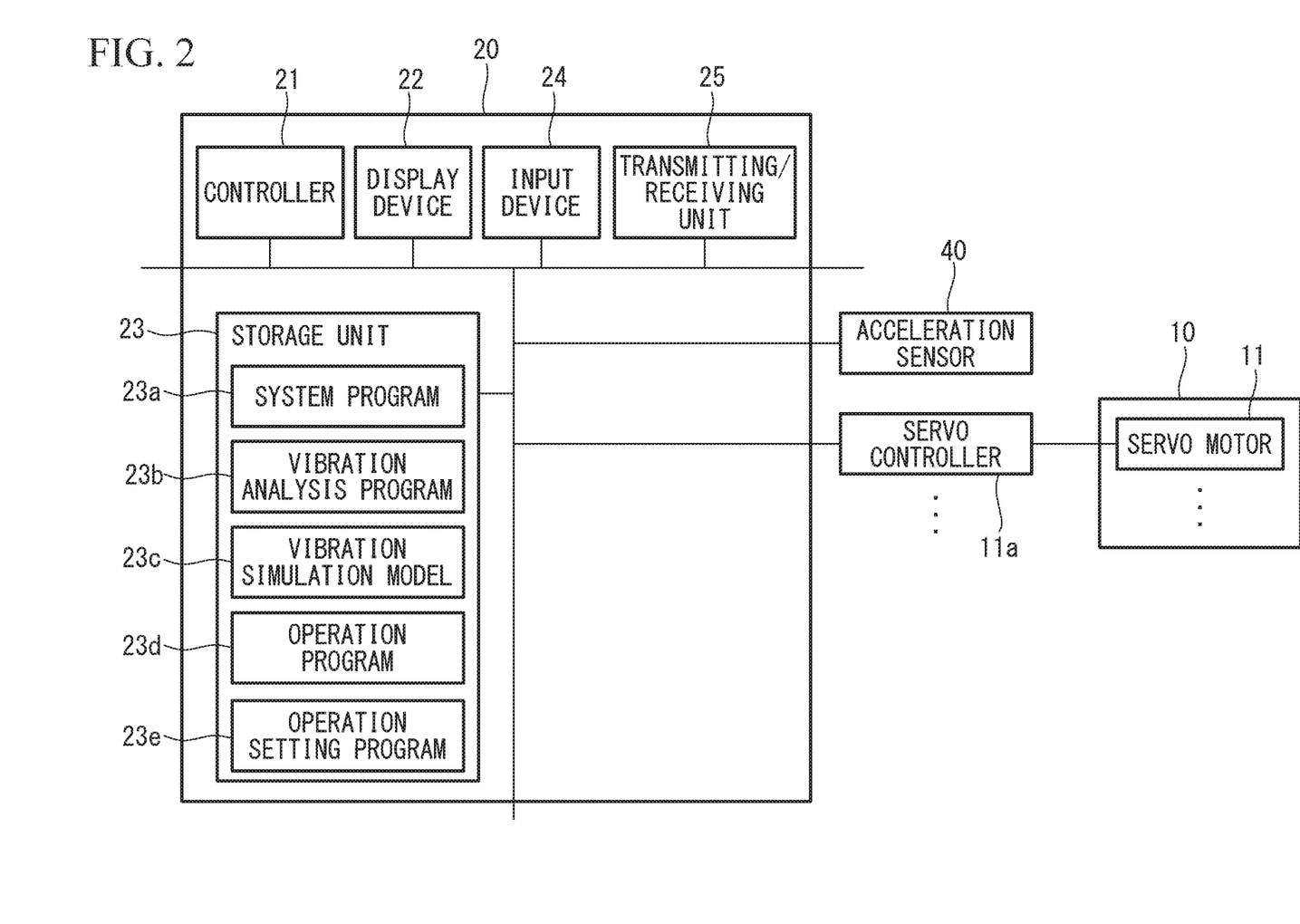
FIG. 2 is a block diagram of a control unit of the vibration analyzer according to the first embodiment.

The control unit 20 includes, as illustrated in FIG. 2, a controller 21 that has a processor and the like; a display device 22; a storage unit 23 that has a non-volatile storage, a ROM, a RAM, and the like; an input device 24 which may include a keyboard, a touch panel, a control panel, and the like; and a transmitting and receiving unit 25 for transmitting and receiving signals. The input device 24 and the transmitting and receiving unit 25 function as an input unit.

In this embodiment, the control unit 20 is a robot control unit configured to control the operation of the robot 10. The control unit 20 is provided inside the robot control unit and may be a control unit having the above-described features.

Also, the control unit 20 may be a teaching device provided at a location different from that of the robot 10 so as to create an operation program for the robot 10, or may be a simulation device capable of analyzing the vibration of the robot 10. If the control unit 20 is a teaching device or simulation device, then the following step S1-2 may be performed not by the control unit 20 but by the robot control unit.

A system program 23a is stored in the storage unit 23. The system program 23a is responsible for implementation of the basic functions of the vibration analyzer. Also, a vibration analysis program 23b is stored in the storage unit 23. Also, a vibration simulation model 23c, an operation program 23d for the robot 10, and an operation setting program 23e for implementation of setting and resetting for the operation program 23d are stored in the storage unit 23. The operation program 23d is a set of control commands for causing the robot 10 to operate when a predetermined task using the end effector 30 is to be performed.

In this embodiment, the controller 21 transmits control commands to the servo controllers 11a (see FIG. 2) of the servo motors 11 on the basis of the operation program 23d. As a result, in order to perform a predetermined task or tasks, the robot 10 changes the position and the orientation of the end effector 30 in accordance with the operation program 23d.

The vibration simulation model 23c includes a model of a workpiece; a provisionally-set vibration calculation model of the end effector 30 for performing a predetermined task on the workpiece; and a vibration calculation model of the robot 10 equipped with the end effector 10 attached to the distal end thereof. The vibration calculation model of the robot 10 is a model for calculation of the vibration of the robot 10, and the provisionally-set vibration calculation model of the end effector 30 is a model for calculation of the vibration of the end effector 30.

The vibration calculation model of the robot 10 is a model that includes stiffness of the individual portions of the robot 10, mass thereof, inertial mass thereof, etc. The provisionally-set vibration calculation model of the end effector 30 is a model that includes provisionally specified stiffness of the individual portions of the end effector 30, provisionally specified mass of the end effector 30, provisionally specified inertial mass of the end effector 30, etc. The vibration calculation models of the robot 10 and the end effector 30 may be a simplified model.

In this embodiment, vibration calculation model of the robot 10 in the vibration simulation model 23c is substantially consistent with the actual robot 10. In other words, the model of the robot 10 is known. Meanwhile, the provisionally set vibration calculation model of the end effector 30 in the vibration simulation model 23c is not completely consistent with the actual end effector 30.

For example, the above-described status is entered when a robot manufacturer ships the robot 10 and a manufacturer mounts the end effector 30 to the robot 10. In particular, the specifications of the end effector 30, wires and cables attached to the end effector 30, etc. may vary depending on the product to be manufactured. As a result, there may be a case where the vibration simulation model 23c does not have a vibration calculation model that is completely consistent with the actual end effector 30.

Figure 4:
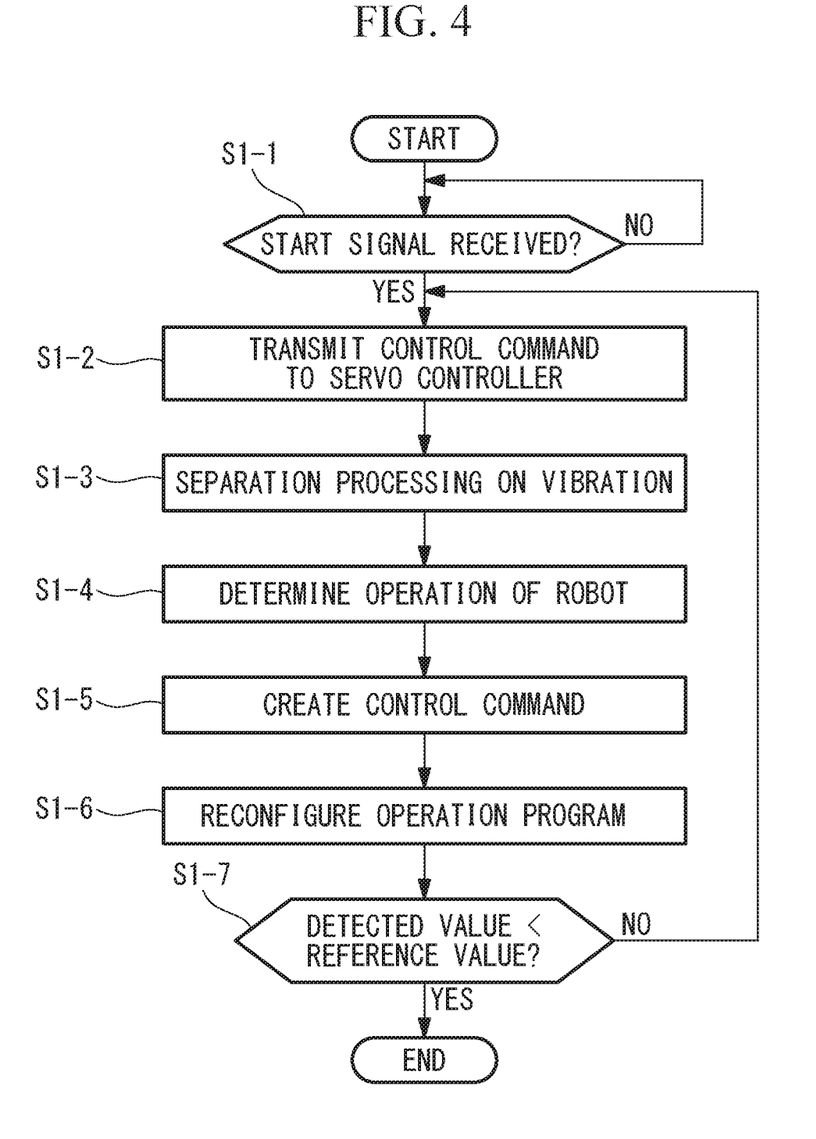
FIG. 4 is a flowchart illustrating processing of the control unit of the vibration analyzer according to the first embodiment.

In the above-described status, in order to reduce the vibration of the working unit 31 of the end effector 30, the controller 21 carries out the following process on the basis of the vibration analysis program 23b, the operation program 23d, and the operation setting program 23e. The following process is illustrated in the flowchart of FIG. 4.

Figure 3:
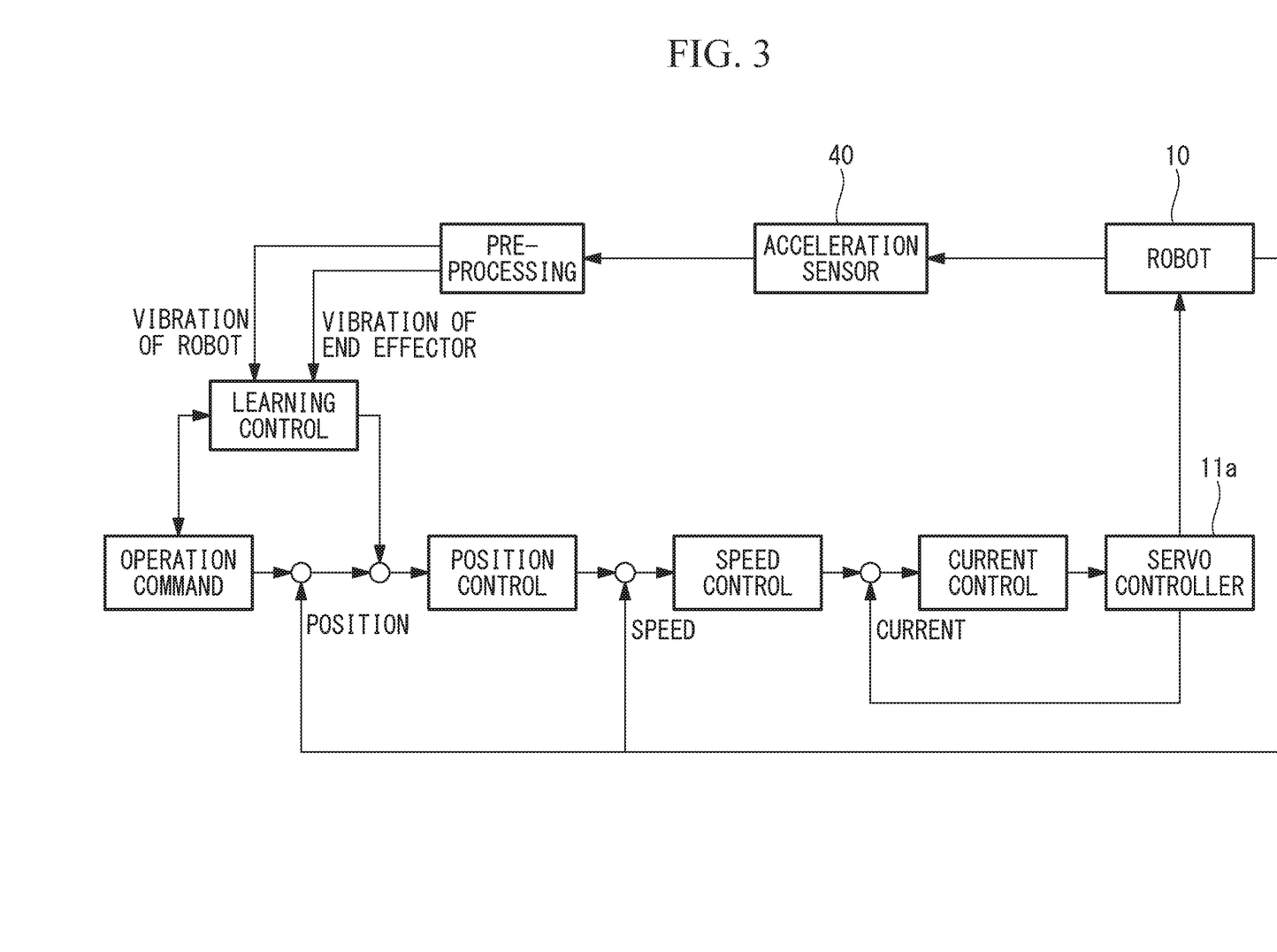
FIG. 3 is a functional block diagram of the vibration analyzer according to the first embodiment.

Also, the functional block diagram corresponding to the following process is illustrated in FIG. 3.

First, when the controller 21 has received a start signal that was input using the input device 24, the transmitting and receiving unit 25, or the like (step S1-1), then the controller 21 transmits control commands based on the operation program 23d to the servo controllers 11a (step S1-2). As a result, the robot 10 operates on the basis of the operation program 23d. At this point, feedback control using the detected values of the operation position detection devices of the individual servo motors 11 is carried out in the same or similar manner as in the well-known robot control, in addition to which feedback control using current values from the individual servo controllers 11a is also carried out. The following explanations are provided in relation to a predetermined operation amongst the operations based on the operation program 23d of the robot 10, but the same or similar process is carried out for the other operations.

The predetermined operation is an operation in which, for example, the end effector 30 is to be moved toward a predetermined location or into a predetermined orientation and the end effector 30 is made to reach the predetermined location and the predetermined orientation. It is possible that the robot 10 and the end effector 30 vibrate when the end effector 30 is arranged in this manner.

The controller 21 separates the vibration actually measured by the acceleration sensor 40 when the above-described arrangement has been performed, where the separation being performed on the basis of the vibration analysis program 23b (step S1-3). Specifically, the controller 21 separates the vibration actually measured by the acceleration sensor 40 into vibration data of the robot 10 and vibration data of the end effector 30 using the vibration calculation model of the robot 10. The above processing corresponds to the preprocessing in FIG. 3.

The vibration data of the robot 10 includes, for example, orientation, frequency, amplitude, acceleration, etc. of the main vibration of the distal end of the robot 10. If the main vibration includes vibrations in multiple orientations, then the vibration data of the robot 10 includes pieces of information such as frequency, amplitude, acceleration, etc. for each of the vibrations in the multiple orientations. The vibration data of the robot 10 may be data that includes pieces of information such as orientation, frequency, amplitude, acceleration, etc. of the main vibration of another portion of the robot 10.

The vibration data of the end effector 30 includes, for example, orientation, frequency, amplitude, acceleration, etc. of the main vibration of working unit 31 of the end effector 30. If the main vibration includes vibrations in multiple orientations, then the vibration data of the end effector 30 includes pieces of information such as frequency, amplitude, acceleration, etc. for each of the vibrations in the multiple orientations. The vibration data of the end effector 30 may be data that includes pieces of information such as orientation, frequency, amplitude, acceleration, etc. of the main vibration of another portion of the end effector 30.

Here, since the robot 10 operates on the basis of the operation program 23d, the predetermined operation of the robot 10 is known. In other words, direction of movement, speed of the movement, acceleration of the movement, posture, etc. of the robot 10 prior to the above-described arrangement are known. The arrangement described herein refers to bringing the end effector 30 into the above-described predetermined location and orientation. Also, the direction of movement, speed of the movement, acceleration of the movement, posture, etc. of other portions of the robot 10 prior to the above-described arrangement are also known. These directions of movement, speeds of movement, accelerations of movement, posture, and the like indicate the vibration actually measured by the acceleration sensor 40, i.e., the operation of the robot 10 causing the vibration to be reduced. Hence, the controller 21 can calculate the orientation, amplitude, acceleration, frequency, etc. of the distal end of the robot 10 to which the end effector 30 is not attached regarding the time when the above-described arrangement was made.

Also, in many cases, the mass and the inertial mass of the robot 10 are sufficiently larger than the mass and the inertial mass of the end effector 30. Hence, as an example, the controller 21 can handle the vibration actually measured by the acceleration sensor 40 as vibration of the end effector 30 caused by the vibration of the distal end of the robot 10 to which the end effector 30 is not attached. In other words, the vibration data of the distal end of the robot 10 is determined by calculation and the vibration data of the end effector 30 attached to the distal end of the robot is determined by the calculation.

As another example, in a state where a mass, an inertial mass, and the like corresponding to the end effector 30 are specified for the distal end of the vibration calculation model of the robot 10, then the orientation, amplitude, acceleration, frequency, etc. of the vibration of the distal end of the robot 10 can be calculated regarding the time at which the above-described arrangement was made. In this case as well, the controller 21 can regard the vibration actually measured by the acceleration sensor 40 as vibration of the end effector 30 caused by the vibration of the distal end of the robot 10. In other words, the vibration data of the distal end of the robot 10 is determined by calculation, and the vibration data of the end effector 30 attached to the distal end of the robot 10 is determined by the calculation.

In a still another example, it is possible to configure a model in which the provisionally set vibration calculation model of the end effector 30 is attached to the distal end of the vibration calculation model of the robot 10. The provisionally set vibration calculation model of the end effector 30 may be a vibration calculation model of a representative end effector whose frequency response is known. In this case, controller 21 can regard the vibration actually measured by the acceleration sensor 40 as the vibration of the provisionally set vibration calculation model of the end effector 30 attached to the distal end of the vibration calculation model of the robot 10. In other words, the vibration data of the distal end of the robot 10 is determined by calculation, and the vibration data of the end effector 30 attached to the distal end of the robot 10 is determined by the calculation.

The vibration data of the distal end of the robot 10 and the vibration data of the end effector 30 can also be determined by using the combination of the above-described specific calculation methods for the above-described separation of the vibrations.

Subsequently, the controller 21 determines the operation of the robot 10 for reducing the vibration of the working unit 31 of the end effector 30 at the time of the above-described arrangement on the basis of the vibration analysis program 23b (step S1-4). When performing the step S1-4, the controller 21 uses the above-described vibration data of the robot 10 and the vibration data of the end effector 30. It should be noted that, when performing the step S1-4, the controller 21 may use only the vibration data of the robot 10 or may use only the vibration data of the end effector 30.

In a simple example, the orientation of the vibration of the distal end of the robot 10 is consistent with the orientation of the vibration of the working unit 31 of the end effector 30. In this case, when the operation where vibration of the distal end of the robot 10 disappears is performed, vibrations of the working unit 31 of the end effector 30 are likely to be reduced or disappear. An example of the operation where vibration of the distal end of the robot 10 disappears is an operation causing the distal end of the robot 10 to be moved to the predetermined arrangement position using the timing, speed, etc. at the time at which an operation where the distal end of the robot 10 is instantaneously stopped or decelerated immediately before the predetermined arrangement position and, the vibration occurring in the distal end of the robot 10 is offset by the stoppage or the deceleration.

In a complex example, the orientation of the vibration of the distal end of the robot 10 differs from the orientation of the vibration of the working unit 31 of the end effector 30. The frequency, etc. of the vibration of distal end of the robot 10 may differ from the frequency, etc. of the vibration of the working unit 31 of the end effector 30. In these cases, the distal end of the robot 10 is moved to the predetermined arrangement position using the timing, speed, and the like at the time at which the distal end of the robot 10 is instantaneously stopped or decelerated immediately before the predetermined arrangement position and, the vibration occurring in the working unit 31 of the end effector 30 is offset by the stoppage or the deceleration. Well-known PID control may be used to reduce the vibration occurring in the working unit 31 of the end effector 30.

Subsequently, the controller 21 creates a control command causing the robot 10 to perform the operation specified in the step S1-4 on the basis of the operation setting program 23e (step S1-5), and resets the operation program 23d using the control command that has been crated (step S1-6). It should be noted that the controller 21 may configure a new operation program in the step S1-6.

Subsequently, the controller 21 repeats the steps S1-2 to S1-6 until the detected value that has been detected by the acceleration sensor 40 becomes lower than the reference value (step S1-7).

In the above-described example, the processing at the steps S1-4 to S1-6 corresponds to the learning control in FIG. 3.

It should be noted that multiple operation programs causing different operations of the robot 10 prior to the above-described arrangement may be stored in the storage unit 23. In other words, the multiple operation programs cause the robot 10 prior to the above-described arrangement to perform different operations from each other. In this case, the controller 21 skips the step S1-4 and sequentially uses the multiple operation programs in the step S1-2 when the steps S1-2 to S1-6 are repeated.

In addition, the controller 21 separates various vibrations actually measured by the acceleration sensor 40 from each other in the step S1-3. Also, in the step S1-5, the controller 21 may obtain a tendency from various pieces of vibration data of the robot 10 and the various pieces of vibration data of the end effector 30 which have been obtained by the step S1-3 and may determine the operation of the robot 10 for reducing the vibration of the working unit 31 of the end effector 30 at the time of the above-described arrangement. At this point, the controller 21 may use only the various pieces of vibration data of the robot 10 or may use only the various pieces of vibration data of the end effector 30.

As described above, in this embodiment, the vibration calculation model of the robot 10 is stored in the storage unit 23. Also, the controller 21 separates the actual vibration of the end effector 30 measured by the acceleration sensor 40 into the vibration data of the robot 10 and the vibration data of the end effector 30 by using the vibration calculation model of the robot 10. Here, the vibration calculation model of the end effector 30 is in many cases simpler than the vibration calculation model of the robot 10.

For example, a spring-mass model with one spring and one mass can be used as the vibration calculation model of the end effector 30. The spring may have a spring constant in three axial directions and a spring constant about three axes. The spring may have a predetermined damping coefficient. As described above, since the vibration calculation model of the end effector 30 is in many cases simpler than the vibration calculation model of the robot 10, it is made possible to efficiently perform vibration reduction on the end effector 30 as a result of the vibration data of the end effector 30 alone being obtained using the above-described separation.

Also, in this embodiment, the controller 21 calculates the vibration occurring in the distal end of the robot 10 by using the operation of the robot 10 causing the vibration to be reduced and the vibration calculation model of the robot 10 and performs the above-described separation by using the vibration that has been calculated. At this point, the vibration calculation model of the robot 10 can also be used in a state where a mass, an inertial mass, and the like corresponding to the end effector 30 are specified for the distal end thereof. In this case, the vibration data of the end effector 30 alone can be obtained using the state of vibration of the distal end of the robot 10. The vibration data of the end effector 30 that has been obtained in this manner is useful in efficiently performing the vibration reduction on the end effector 30.

In another example of this embodiment, the controller 21 uses the operation of the robot 10 causing the vibration to be reduced, the vibration calculation model of the robot 10 and the provisionally set vibration calculation model of the end effector 30, and separates the vibration to be reduced that has been measured by the acceleration sensor 40 into the vibration data of the robot 10 and the vibration data of the end effector 30. In this case as well, the vibration data of the end effector 30 alone and the vibration data of the robot 10 alone can be obtained. In other words, it is made possible to efficiently perform the vibration reduction on the end effector 30 by using the vibration data of the end effector 30 alone and/or the vibration data of the robot 10 alone.

Also, in this embodiment, the controller 21 uses at least one of the vibration data of the robot 10 and the vibration data of the end effector 30 and performs resetting of the operation program 23d or setting of a new operation program. As a result, the resetting of the operation program for reducing the vibrations of the end effector 30 or setting of a new operation program with small vibration of the end effector 30 is efficiently performed.

The vibration analyzer according to a second embodiment of the present invention is described below with reference to the drawings.

In the second embodiment, the same reference signs are assigned to the same or similar elements as those in the first embodiment and the explanations of the same or similar elements and processes as those in the first embodiment are not repeated. Also, the second embodiment can also be modified in the same manner as in the first embodiment. For example, it is possible to replace the acceleration sensor 40 by another sensor such as a vision system and replace the control unit 20 by a simulation device or the like.

Figure 5:
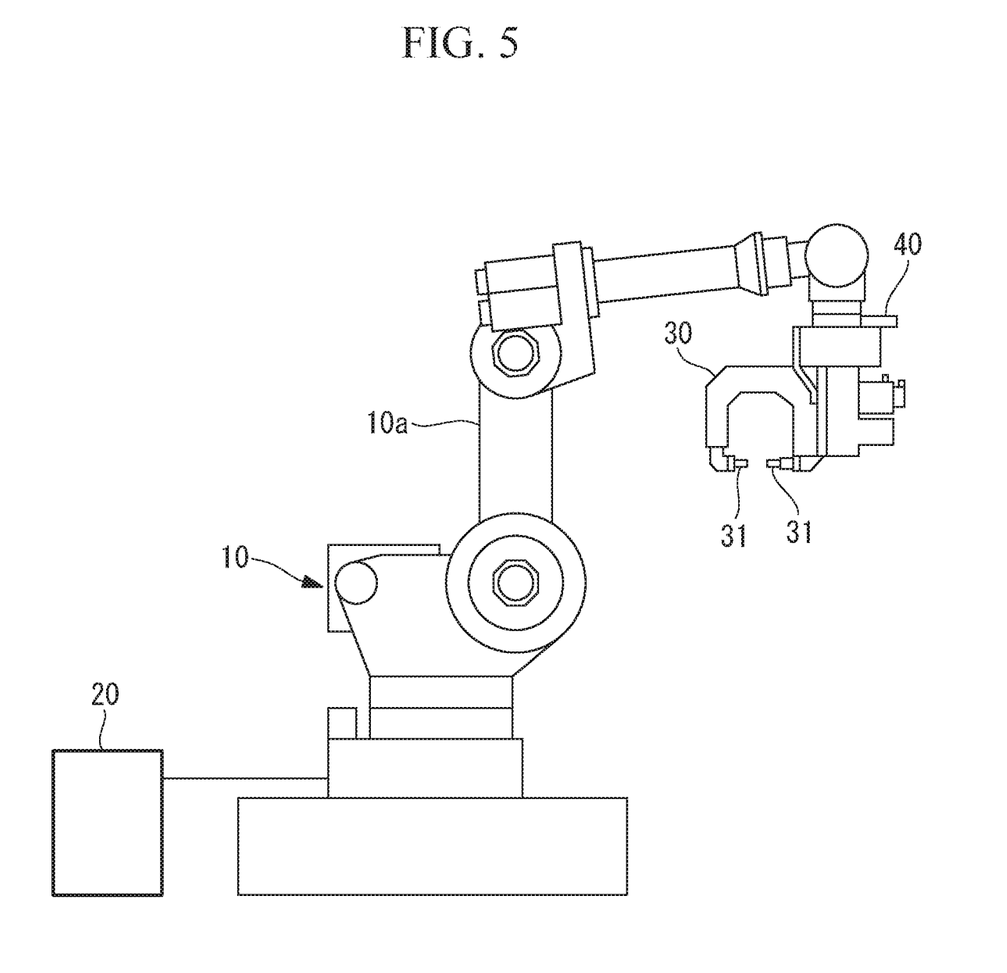
FIG. 5 is a schematic configuration diagram of a vibration analyzer according to a second embodiment of the present invention.

While the acceleration sensor 40 in the first embodiment is attached to the end effector 30, the acceleration sensor 40 in the second embodiment is configured to measure the vibration of the distal end of the robot 10 as illustrated in FIG. 5. The acceleration sensor 40 is attached, for example, to the distal end of the robot 10. Also, in the second embodiment, the vibration simulation model 23c has the model of a workpiece, the vibration calculation model of the end effector 30 for performing a predetermined task on the workpiece, and the provisionally set vibration calculation model of the robot 10 to which the end effector 30 is attached at the distal end thereof.

The provisionally set vibration calculation model of the robot 10 is a model that includes provisionally specified stiffness, provisionally specified mass, provisionally specified inertial mass, etc. of the individual portions of the robot 10. The vibration calculation model of the end effector 30 is a model that includes stiffness, mass, inertial mass, etc. of the individual portions of the end effector 30. The vibration calculation models of the robot 10 and the end effector 30 may be a simplified model.

In the second embodiment, the vibration calculation model of the end effector 30 in the vibration simulation model 23c is substantially consistent with the actual end effector 30. In other words, the model of the end effector 30 is known. Meanwhile, the provisionally set vibration calculation model of the robot 10 in the vibration simulation model 23c is not completely consistent with the actually installed robot 10.

For example, the above-described status is realized when a robot manufacturer ships the robot 10 and a manufacturer installs the robot 10. In particular, the above-described status is realized in a case where various wires or cables are supported by an outer circumferential surface of an arm 10a of the robot 10, a case where various wires and/or cables are supported inside the arm 10a of the robot 10, a case where a cover is attached to the robot 10 for the purpose of dust prevention, dirt prevention, explosion proof, or the like, or any other relevant cases. The specifications of the accessories of the robot 10, wires and cables attached to the robot 10, and the like vary depending on the product to be manufactured. As a result, there may be a case where the vibration simulation model 23c does not have a vibration calculation model that is completely consistent with the actually installed robot 10.

Figure 6:
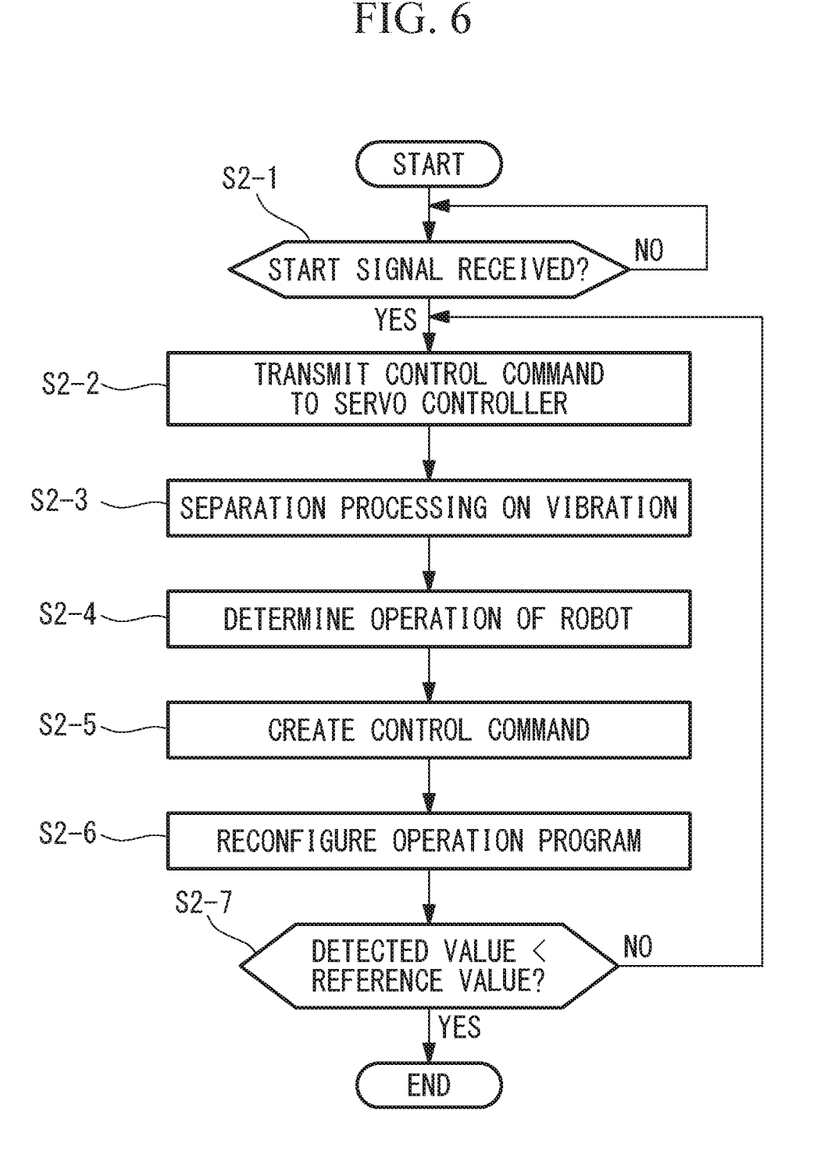
FIG. 6 is a flowchart illustrating processing of a control unit of the vibration analyzer according to the second embodiment.

In the above-described status, in order to reduce the vibration of the working unit 31 of the end effector 30, the controller 21 performs the following process on the basis of the vibration analysis program 23b, the operation program 23d, and the operation setting program 23e. The following process is illustrated in the flowchart of FIG. 6.

First, when the controller 21 has received a start signal that was input using the input device 24, the transmitting and receiving unit 25, or the like (step S2-1), then the controller 21 transmits the control commands in accordance with the operation program 23d to the servo controllers 11a (step S2-2). As a result, the robot 10 operates on the basis of the operation program 23d. Although the following explanations are provided in relation to a predetermined operation amongst the operations based on the operation program 23d of the robot 10, the same or similar process is carried out for the other operations.

The predetermined operation is an operation in which, for example, the end effector 30 is to be moved toward a predetermined location and into a predetermined orientation and the end effector 30 is made to reach the predetermined location and the predetermined orientation. The robot 10 and the end effector 30 vibrate when the end effector 30 is arranged in this manner.

The controller 21 perform separation processing on the vibration actually measured by the acceleration sensor 40 when the above-described arrangement has been performed, where the separation being performed on the basis of the vibration analysis program 23b (step S2-3). Specifically, the controller 21 calculates the vibration data of the robot 10 and the vibration data of the end effector 30 based on the vibration actually measured by the acceleration sensor 40 and using the vibration calculation model of the end effector 30.

Here, since the robot 10 operates on the basis of the operation program 23d, the predetermined operation of the robot 10 is known. In other words, the direction of movement, speed of the movement, acceleration of the movement, posture, etc. of the distal end of the robot 10 prior to the above-described arrangement are known. The direction of movement, speed of movement, acceleration of movement, posture, etc. indicate the vibration actually measured by the acceleration sensor 40, i.e., the operation of the robot 10 causing the vibration to be reduced. Hence, the controller 21 can calculate, regarding the time at which the above-described arrangement was made, the orientation, amplitude, acceleration, frequency, etc. of the vibration of the working unit 31 and the like of the end effector 30 on the basis of the direction of movement, speed of the movement, acceleration of the movement, posture, etc. of the distal end of the robot 10 prior to the above-described arrangement.

Here, the vibration actually measured by the acceleration sensor 40 can be handled as vibration affected by the vibration of the end effector 30 and the vibration of the robot 10 determined by the above-described calculation. In other words, the vibration actually measured by the acceleration sensor 40 can be handled not as the vibration of the distal end of the robot 10 to which the end effector 30 is not attached but as the vibration of the distal end of the robot 10 which has been changed by the vibration of the end effector 30. As a result, the vibration input acting upon from the end effector 30 upon the distal end of the robot 10 while the vibration is occurring can be ascertained by using the vibration data of the end effector 30. In other words, the vibration data of the distal end of the robot 10 to which the end effector 30 is not attached and the like are determined by the calculation. The vibration data can be used as the above-described vibration data of the robot 10.

As another example, it is possible to configure a model in which the vibration calculation model of the end effector 30 is attached to the distal end of the provisionally set vibration calculation model of the robot 10. In this case, the controller 21 can handle the vibration actually measured by the acceleration sensor 40 as the vibration of the vibration calculation model of the end effector 30 attached to the distal end of the provisionally set vibration calculation model of the robot 10. In other words, the vibration data of the distal end of the robot 10 to which the end effector 30 is not attached, and the like are determined by the calculation. The vibration data can be used as the above-described vibration data of the robot 10. Also, the vibration data of the end effector 30 attached to the distal end of the robot can also be determined by the calculation.

The vibration data of the robot 10 and the vibration data of the end effector 30 can also be determined by using the combination of the above-described specific calculation methods for the above-described separation.

Subsequently, the controller 21 determines the operation of the robot 10 for reducing the vibration of the working unit 31 of the end effector 30 at the time of the above-described arrangement on the basis of the vibration analysis program 23*b* (step S2-4). When performing the step S2-4, the controller 21 uses the above-described vibration data of the robot 10 and the vibration data of the end effector 30. It should be noted that, when performing the step S2-4, the controller 21 may use only the vibration data of the robot 10 or may use only the vibration data of the end effector 30.

Subsequently, the controller 21 creates a control command causing the robot 10 on the basis of the operation setting program 23*e* to perform the operation specified in the step S2-4 (step S2-5), and resets the operation program 23*d* using the control command that has been crated (step S2-6). It should be noted that the controller 21 may configure a new operation program in the step S2-6.

Subsequently, the controller 21 repeats the steps S2-2 to S2-6 until the detected value that has been detected by the acceleration sensor 40 becomes lower than the reference value (step S2-7).

In the above-described example, the processing at the steps S2-4 to S2-6 corresponds to the learning control in FIG. 3.

It should be noted that multiple operation programs causing different operations of the robot 10 prior to the above-described arrangement may be stored in the storage unit 23. In other words, the multiple operation programs cause the robot 10 prior to the above-described arrangement to perform different operations from each other. In this case, the controller 21 skips the step S2-4 and sequentially uses the multiple operation programs in the step S2-2 when the steps S2-2 to S2-6 are repeated.

In addition, in the step S2-3, the controller 21 separates various vibrations actually measured by the acceleration sensor 40 from each other. Also, in the step S2-5, the controller 21 may obtain a tendency from various pieces of vibration data of the robot 10 and the various pieces of vibration data of the end effector 30 which are obtained in the step S2-3 and may determine the operation of the robot 10 for reducing the vibration of the working unit 31 of the end effector 30 at the time of the above-described arrangement. At this point, the controller 21 may use only the various pieces of vibration data of the robot 10 or may use only the various pieces of vibration data of the end effector 30.

As described above, in the second embodiment, the vibration calculation model of the end effector 30 is stored in the storage unit 23. Also, the controller 21 computes the vibration data of the robot 10 and the vibration data of the end effector 30 based on the actual vibration of the distal end of the robot 10 that has been measured by the acceleration sensor 40 and using the vibration calculation model of the end effector 30.

Here, the vibration calculation model of the end effector 30 is known. As a result, the vibration of the end effector 30 alone can be relatively accurately calculated by using the direction of movement, speed of the movement, acceleration of the movement, posture, etc. of the distal end of the robot 10 prior to the above-described arrangement and the vibration calculation model of the end effector 30. As a result, for example, the vibration data of the robot 10 in a state where the end effector 30 is not attached thereto can also be relatively accurately calculated by the above-described separation. As a result, it is made possible to efficiently perform the vibration reduction on the end effector 30.

Also, in the second embodiment, the controller 21 uses the operation of the robot 10 causing the vibration to be reduced and the vibration calculation model of the end effector 30 to calculate the vibration occurring in the end effector 30 and performs the above-described separation using the vibration that has been calculated.

The vibration calculation model of the end effector 30 is in many cases simpler than the vibration calculation model of the robot 10. As a result, the vibration of the end effector 30 alone can be relatively accurately calculated by using the direction of movement, speed of the movement, acceleration of the movement, posture, etc. of the distal end of the robot 10 prior to the above-described arrangement and the vibration calculation model of the end effector 30.

For example, a spring-mass model with one spring and one mass can be used as the vibration calculation model of the end effector 30. The spring may have a spring constant in three axial directions and a spring constant about three axes. The spring may have a predetermined damping coefficient. As described above, the vibration calculation model of the end effector 30 is in many cases simpler than the vibration calculation model of the robot 10. As a result, the vibration data of the end effector 30 alone is obtained by using the above-described separation, as a result of which the vibration data of the robot 10 alone can be relatively accurately calculated. As a result, it is made possible to efficiently perform the vibration reduction on the end effector 30.

In another example of the second embodiment, the controller 21 obtains the vibration data of the robot 10 and the vibration data of the end effector 30 through calculation from the vibration to be reduced measured by the acceleration sensor 40 by using the operation of the robot 10 causing the vibration to be reduced, the provisionally set vibration calculation model of the robot 10, and the vibration calculation model of the end effector 30.

Here, the model of the robot 10 to which no accessories such as wires/cables, a cover, and the like are attached is known in many cases. For example, it is also possible to use the model of the robot 10 to which wires/cables, accessories, and the like are not attached as the provisionally set vibration calculation model. It is possible to use a model of the robot 10 in which a mass corresponding to wires/cables and accessories is added to a predetermined location as the vibration calculation model. In this case as well, the vibration data of the end effector 30 alone and the vibration data of the robot 10 alone can be calculated. In other words, it is made possible to efficiently perform the vibration reduction on the end effector 30 by using the vibration data of the end effector 30 alone and/or the vibration data of the robot 10 alone.

Also, in the second embodiment, the controller 21 uses at least one of the vibration data of the robot 10 and the vibration data of the end effector 30 and performs resetting of the operation program 23*d* or setting of a new operation program. As a result, the resetting of the operation program for reducing the vibrations of the end effector 30 or setting of a new operation program with small vibration of the end effector 30 is efficiently performed.

The vibration analyzer according to a third embodiment of the present invention is described below with reference to the drawings.

In the third embodiment, the same reference signs are assigned to the same or similar elements as those in the first embodiment and the explanations of the same or similar elements and processes as those in the first embodiment are not repeated. Also, the third embodiment can also be modified in the same manner as in the first embodiment. For example, it is possible to replace the control unit 20 by a simulation device or the like.

Figure 7:
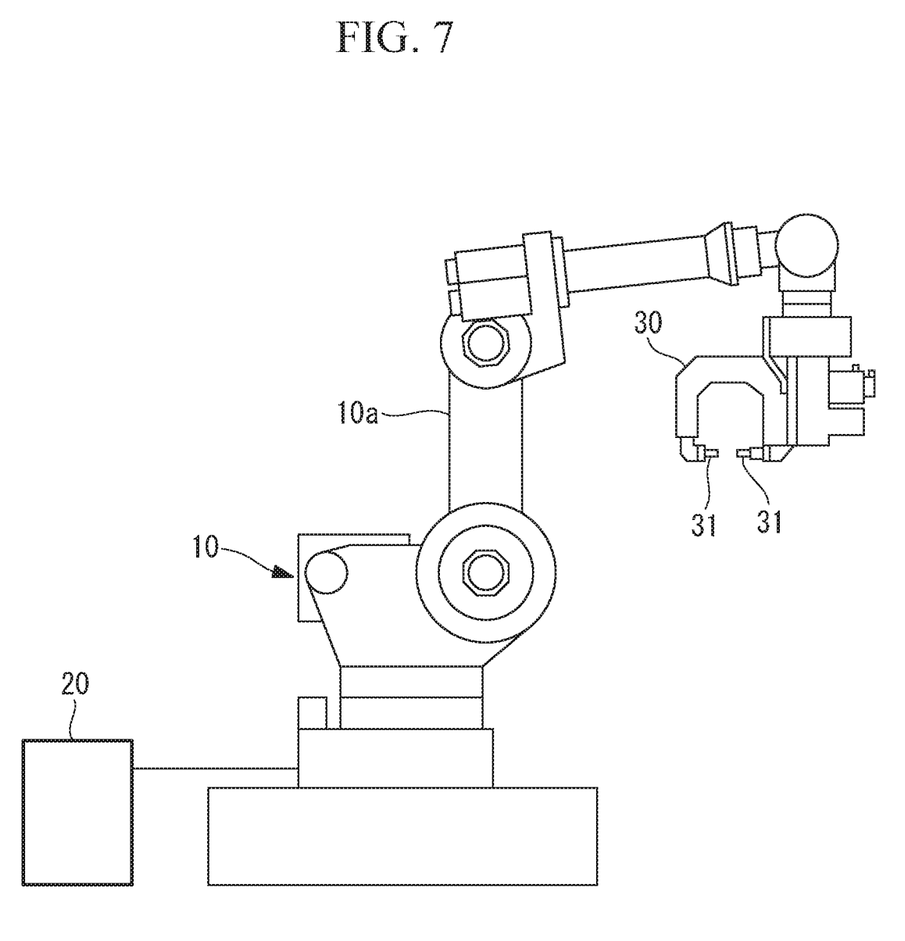
FIG. 7 is a schematic configuration diagram of a vibration analyzer according to a third embodiment of the present invention.

While the acceleration sensor 40 is used in the first embodiment, the acceleration sensor 40 is not used in the third embodiment as illustrated in FIG. 7. Also, in the third embodiment, the vibration simulation model 23c has the model of a workpiece, the vibration calculation model of the end effector 30 for performing a predetermined task on the workpiece, and the vibration calculation model of the robot 10 to which the end effector 30 is attached at the distal end thereof.

The vibration calculation model of the robot 10 is a model that includes stiffness, mass, inertial mass, etc. of the individual portions of the robot 10. The vibration calculation model of the end effector 30 is a model that includes stiffness, mass, inertial mass, etc. of the individual portions of the end effector 30. The vibration calculation models of the robot 10 and the end effector 30 may be a simplified model.

In the third embodiment, the vibration calculation model of the robot 10 in the vibration simulation model 23c is substantially consistent with the actual robot 10. In other words, the model of the robot 10 is known. The vibration calculation model of the robot 10 also includes parameters that changes depending on the specifications of the accessories of the robot 10, wires and cables attached to the robot 10, and the like. Also, the vibration calculation model of the end effector 30 in the vibration simulation model 23c is substantially consistent with the actual end effector 30. In other words, the model of the end effector 30 is known as well.

Figure 8:
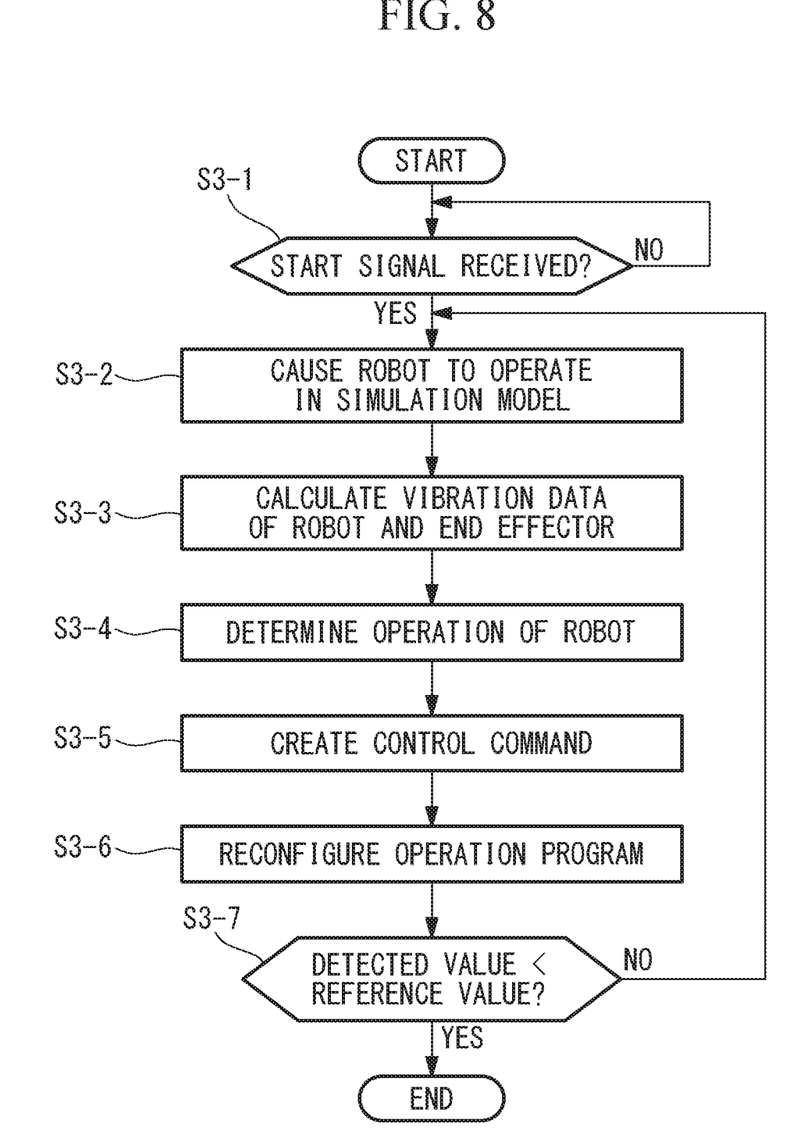
FIG. 8 is a flowchart illustrating processing of a control unit of the vibration analyzer according to the third embodiment.

In the above-described status, in order to reduce the vibration of the working unit 31 of the end effector 30, the controller 21 performs the following process on the basis of the vibration analysis program 23b, the operation program 23d, and the operation setting program 23e. The following process is illustrated in the flowchart of FIG. 8.

First, when the controller 21 has received a start signal that was input using the input device 24, the transmitting and receiving unit 25, or the like (step S3-1), then the controller 21 causes the robot 10 to operate in the vibration simulation model 23c on the basis of the operation program 23d (step S3-2). As a result, the robot 10 operates on the basis of the operation program 23d in the vibration simulation model 23c. The following explanations are provided in relation to a predetermined operation amongst the operations based on the operation program 23d of the robot 10, but the same or similar process is carried out for the other operations.

The predetermined operation is an operation where, for example, the end effector 30 is moved to a predetermined location and into a predetermined orientation and the end effector 30 is made to reach the predetermined location and orientation. The robot 10 and the end effector 30 vibrate when the end effector 30 is arranged in this manner.

The controller 21 calculates, on the basis of the vibration analysis program 23b, the vibration data of the robot 10 and the vibration data of the end effector 10 from the vibration occurring in the robot 10 and the end effector 30 in the vibration simulation model 23c when the above-described arrangement is performed (step S3-3; vibration calculation processing). Specifically, the controller 21 uses the vibration calculation model of the robot 10 and the vibration calculation model of the end effector 30 to determine the vibration data of the robot 10 and the vibration data of the end effector 30.

Here, since the robot 10 operates on the basis of the operation program 23d, the predetermined operation of the robot 10 is known. In other words, the direction of movement, speed of the movement, acceleration of the movement, posture, etc. of the distal end of the robot 10 prior to the above-described arrangement are known. The direction of movement, speed of movement, acceleration of movement, posture, etc. indicate the vibration of the robot 10 and the end effector 30, i.e., the operation of the robot 10 causing the vibration to be reduced.

As a result, the controller 21 can calculate the orientation, amplitude, acceleration, frequency, etc. of the vibration of the working unit 31 of the end effector 30 regarding the time at which the above-described arrangement was made. Also, the controller 21 can calculate the orientation, amplitude, acceleration, frequency, etc. of the vibration of the distal end of the robot 10 regarding the time at which the above-described arrangement was made. In other words, the vibration data of the distal end of the robot 10 is determined by calculation, and the vibration data of the end effector 30 attached to the distal end of the robot is determined by the calculation.

Subsequently, the controller 21 determines the operation of the robot 10 for reducing the vibration of the working unit 31 of the end effector 30 at the time of the above-described arrangement on the basis of the vibration analysis program 23b (step S3-4). When performing the step S3-4, the controller 21 uses the above-described vibration data of the robot 10 and the vibration data of the end effector 30. It should be noted that, when performing the step S3-4, the controller 21 may use only the vibration data of the robot 10 or may use only the vibration data of the end effector 30.

Subsequently, the controller 21, on the basis of the operation setting program 23e, creates a control command causing the robot 10 to perform the operation specified in the step S3-4 (step S3-5), and resets the operation program 23d using the control command that has been crated (step S3-6). It should be noted that the controller 21 may configure a new operation program in the step S3-6.

Subsequently, the controller 21 repeats the steps S3-2 to S3-6 until the vibration of the working unit 31 of the end effector 30 becomes lower than the reference value (step S3-7).

In the above-described example, the processing at the steps S3-4 to S3-6 corresponds to the learning control in FIG. 3 and it can also be described as operation program setting processing.

It should be noted that multiple operation programs causing different operations of the robot 10 prior to the above-described arrangement may be stored in the storage unit 23. In other words, the multiple operation programs cause the robot 10 prior to the above-described arrangement to perform different operations from each other. In this case, the controller 21 skips the step S3-4 and sequentially uses the multiple operation programs in the step S3-2 when the steps S3-2 to S3-6 are repeated.

In addition, in the step S3-3, the controller 21 calculates the various pieces of vibration data of the robot 10 and the various pieces of vibration data of the end effector 10. Also, in the step S3-5, the controller 21 obtains a tendency from the various pieces of vibration data of the robot 10 and the various pieces of vibration data of the end effector 30 which have been obtained in the step S3-3, and may determine the operation of the robot 10 for reducing the vibration of the working unit 31 of the end effector 30 at the time of the above-described arrangement. At this point, the controller 21 may use only the various pieces of vibration data of the robot 10 or may use only the various pieces of vibration data of the end effector 30.

As described above, in the third embodiment, the vibration calculation model of the robot 10 and the vibration calculation model of the end effector 30 are stored in the storage unit 23. Also, the controller 21 calculates the vibration data of the robot 10 and the vibration data of the end effector 10 from the vibration occurring in the robot 10 and the end effector 30 in the vibration simulation model 23*c*.

Here, the vibration calculation model of the robot 10 is known. Also, the vibration calculation model of the end effector 30 is also known. As a result, the vibration of the robot 10 alone and the vibration of the end effector 30 alone can be relatively accurately calculated by using the direction of movement, speed of the movement, acceleration of the movement, posture, etc. of the distal end of the robot 10 prior to the above-described arrangement, the vibration calculation model of the robot 10, and the model of the end effector 30. As a result, it is made possible to efficiently perform the vibration reduction on the end effector 30.

It should be noted that the robot 10 is a vertical articulated robot in FIGS. 1, 5, and 7 but the robot 10 may also be a horizontal articulated robot or a robot of any other types. In this case as well, the same or similar effects as those described in the foregoing can be achieved.

The following aspects are derived from the above embodiments.

A vibration analyzer according to a first aspect of the present invention includes a sensor configured to measure a vibration of an end effector supported by a distal end of a robot; a storage unit configured to store a vibration calculation model of the robot; and a control unit configured to perform separation processing for separating vibration to be reduced that is measured by the sensor into vibration data of the robot and vibration data of the end effector by using the vibration calculation model of the robot.

In the first aspect, the vibration calculation model of the robot is stored in the storage unit. Also, the control unit separates the actual vibration of the end effector measured by the sensor into vibration data of the robot and vibration data of the end effector by using the vibration calculation model of the robot. Here, the vibration calculation model of the end effector is in many cases simpler than the vibration calculation model of the robot.

For example, a spring-mass model with one spring and one mass can be used as the vibration calculation model of the end effector. The spring may have a spring constant in three axial directions and a spring constant about three axes. The spring may have a predetermined damping coefficient. As described above, since the vibration calculation model of the end effector is in many cases simpler than the vibration calculation model of the robot, as a result of the vibration data of the end effector alone being obtained using the above-described separation, it is made possible to efficiently perform vibration reduction on the end effector.

In the above-described aspect, preferably, the control unit calculates a vibration occurring at the distal end of the robot by using operation of the robot causing the vibration to be reduced and the vibration calculation model of the robot, and performs the separation processing using the calculated vibration.

In this case, it is made possible to obtain the vibration data of the end effector alone by using the state of vibration of the distal end of the robot. The vibration data of the end effector obtained in this manner is useful in efficiently performing the vibration reduction on the end effector.

In the above-described aspect, preferably, the control unit separates the vibration to be reduced that is measured by the sensor into the vibration data of the robot and the vibration data of the end effector by using operation of the robot causing the vibration to be reduced, the vibration calculation model of the robot, and a provisionally set vibration calculation model of the end effector.

In this case, it is made possible to obtain the vibration data of the end effector alone and the vibration data of the robot alone. In other words, it is made possible to efficiently perform the vibration reduction on the end effector by using the vibration data of the end effector alone and/or the vibration data of the robot alone.

A vibration analyzer according to a second aspect of the present invention includes a sensor configured to measure a vibration of a robot; a storage unit configured to store a vibration calculation model of an end effector supported by a distal end of the robot; and a control unit configured to perform separation processing for obtaining vibration data of the robot and vibration data of the end effector by performing calculation based on vibration to be reduced that is measured by the sensor by using the vibration calculation model of the end effector.

In the second aspect, the vibration calculation model of the end effector is stored in the storage unit. Also, the control unit calculates vibration data of the robot and the vibration data of the end effector from the actual vibration of the distal end of the robot measured by the sensor by using the vibration calculation model of the end effector.

Here, the vibration calculation model of the end effector is known. As a result, the vibration of the end effector alone can be relatively accurately calculated by using the direction of movement, speed of the movement, acceleration of the movement, posture, etc. of the distal end of the robot prior to the arrangement of the end effector at a predetermined location and the vibration calculation model of the end effector. As a result, the vibration data of the robot alone can be relatively accurately calculated by the above-described separation. As a result, it is made possible to efficiently perform the vibration reduction on the end effector.

In the second aspect, preferably, the control unit calculates a vibration occurring in the end effector by using operation of the robot causing the vibration to be reduced and the vibration calculation model of the end effector, and performs the above-described separation processing by using the calculated vibration.

The vibration calculation model of the end effector is in many cases simpler than the vibration calculation model of the robot. As a result, the vibration of the end effector alone can be relatively accurately calculated by using the direction of movement, speed of the movement, acceleration of the movement, posture, and the like of the distal end of the robot prior to the arrangement of the end effector at the predetermined location and the vibration calculation model of the end effector.

For example, a spring-mass model with one spring and one mass can be used as the vibration calculation model of the end effector. The spring may have a spring constant in three axial directions and a spring constant about three axes. The spring may have a predetermined damping coefficient. As described above, the vibration calculation model of the end effector is in many cases simpler than the vibration calculation model of the robot. As a result, when the vibration data of the end effector alone is obtained using the above-described separation, the vibration data of the robot alone can also be relatively accurately calculated. As a result, it is made possible to efficiently perform the vibration reduction on the end effector.

In the second aspect, preferably, the control unit obtains the vibration data of the robot and the vibration data of the end effector through the calculation based on the vibration to be reduced that is measured by the sensor by using operation of the robot causing the vibration to be reduced, a provisionally set vibration calculation model of the robot, and the vibration calculation model of the end effector.

Here, the model of the robot to which no accessories such as wires/cables, a cover, and the like are attached is known in many cases. For example, it is also possible to use the model of the robot to which wires/cables, accessories, and the like are not attached as the provisionally set vibration calculation model. It is also possible to use a model of the robot in which a mass corresponding to wires/cables and accessories is added to a predetermined location as the vibration calculation model. In this case as well, the vibration data of the end effector alone and the vibration data of the robot alone can be calculated. In other words, by using the vibration data of the end effector alone and/or the vibration data of the robot alone, it is made possible to efficiently perform the vibration reduction on the end effector.

In the first and second aspects, preferably, the robot is configured to perform the predetermined operation on the basis of an operation program stored in the storage unit, and the control unit is configured to perform resetting of the operation program or setting of a new operation program by using at least one of the vibration data of the robot and the vibration data of the end effector.

In this case, resetting of the operation program for reducing the vibrations of the end effector or setting of a new operation program where the vibration of the end effector is small is efficiently performed.

A vibration analyzer according to a third aspect of the present invention includes a storage unit configured to store a vibration calculation model of a robot and a vibration calculation model of an end effector supported by the robot; and a control unit, wherein the robot and the end effector causing various vibrations when arrangement of the end effector to a predetermined location is performed depending on operation of the robot prior to the arrangement, the control unit is configured to perform vibration calculation processing for calculating vibration data of the robot and vibration data of the end effector for each of the various vibrations by using the vibration calculation model of the robot and the vibration calculation model of the end effector and operation program setting processing for setting or resetting an operation program of the robot for performing the arrangement by using at least one of a vibration of the robot and a vibration of the end effector.

In the third aspect, the vibration calculation model of the robot and the vibration calculation model of the end effector are stored in the storage unit. Also, the control unit calculates the vibration data of the robot and the vibration data of the end effector based on the vibrations occurring in the robot and the end effector when the arrangement at the predetermined location is performed.

Here, the vibration calculation model of the robot is known. Also, the vibration calculation model of the end effector is also known. As a result, the vibration of the robot alone and the vibration of the end effector alone can be relatively accurately calculated by using the direction of movement, speed of the movement, acceleration of the movement, posture, and the like of the distal end of the robot prior to the above-described arrangement, the vibration calculation model of the robot, and the model of the end effector. As a result, it is made possible to efficiently perform the vibration reduction on the end effector.

A fourth aspect of the present invention provides a vibration analysis method for analyzing, by a control unit, a vibration of an end effector supported by a distal end of a robot actually measured by a sensor that measures the vibration. The vibration analysis method includes performing, by the control unit, separation processing for separating the vibration to be reduced that is measured by the sensor into vibration data of the robot and vibration data of the end effector by using a vibration calculation model of the robot stored in a storage unit.

A fifth aspect of the present invention provides a vibration analysis method for analyzing, by a control unit, a vibration of a robot actually measured by a sensor that measures the vibration, the robot being provided with an end effector, the method comprising: performing, by the control unit, separation processing for obtaining vibration data of the robot and vibration data of the end effector by performing calculation based on the vibration to be reduced that is measured by the sensor by using the vibration calculation model of the end effector stored in a storage unit.

A sixth aspect of the present invention provides a vibration analysis method for analyzing, by a control unit, a vibration of a robot and an end effector supported by the robot, the robot and the end effector causing various vibrations when arrangement of the end effector to a predetermined location is performed depending on operation of the robot prior to the arrangement, the method comprising: performing, by the control unit, vibration calculation processing for calculating vibration data of the robot and vibration data of the end effector for each of the various vibrations by using a vibration calculation model of the robot and a vibration calculation model of the end effector, and performing, by the control unit, operation program setting processing for setting or resetting an operation program of the robot for performing the arrangement by using at least one of the vibration data of the robot and the vibration data of the end effector.

According to the above aspects, it is made possible to efficiently reduce vibrations of a robot equipped with an end effector installed at an actual location of installation.

REFERENCE SIGNS LIST 10 robot
10a arm
11 servo motor
11a servo controller
20 control unit
21 controller
22 display device
23 storage unit
23a system program
23b vibration analysis program
23c vibration simulation model
23d operation program
23e operation setting program
24 input device
25 transmitting and receiving unit
30 end effector
31 working unit
40 acceleration sensor

The invention claimed is:

1. A vibration analyzer comprising:
a sensor configured to measure an effector vibration of an end effector supported by a distal end of a robot;
at least one memory configured to store a vibration calculation model of the robot; and
at least one processor configured to:
calculate a robot vibration of the distal end of the robot to which the end effector is not attached on the basis of operation of the robot when the vibration of the end effector is measured by the sensor and the vibration calculation model of the robot; and
calculate a vibration state of the end effector based on the calculated robot vibration of the distal end of the robot and the effector vibration of the end effector measured by the sensor.

2. The vibration analyzer according to claim 1, wherein the robot is configured to perform a predetermined operation on a basis of an operation program stored in the at least one memory, and
the at least one processor is configured to perform resetting of the operation program or setting of a new operation program by using at least one of robot vibration of the distal end of the robot that is calculated and the vibration state of the end effector that is calculated.

3. A vibration analyzer comprising:
a sensor configured to measure a vibration of an end effector supported by a distal end of a robot;
at least one memory configured to store a vibration calculation model of the robot;
at least one processor configured to separate vibration, which is to be reduced and which is measured by the sensor, into vibration data of the robot and vibration data of the end effector by using the vibration calculation model of the robot; and
wherein the processor is configured to separate the vibration, which is to be reduced and which is measured by the sensor, into the vibration data of the robot and the vibration data of the end effector by using an operation of the robot which causes the vibration, the vibration calculation model of the robot, and a provisionally set vibration calculation model of the end effector.

4. A vibration analyzer comprising:
a sensor configured to measure a robot vibration of a distal end of a robot;
at least one memory configured to store a vibration calculation model of an end effector supported by the distal end of the robot; and
at least one processor configured to:
calculate an effector vibration of the end effector based on the robot vibration measured by the sensor and the vibration calculation model of the end effector;
calculate a vibration input that is input into the distal end of the robot from the end effector by the calculated effector vibration of the end effector; and
calculate a vibration of the distal end of the robot to which the end effector is not attached by using the calculated vibration input.

5. A vibration analyzer comprising:
a sensor configured to measure a vibration of a robot;
at least one memory configured to store a vibration calculation model of an end effector supported by a distal end of the robot; and
at least one processor configured to separate vibration, which is to be reduced and which is measured by the sensor, into vibration data of the robot and vibration data of the end effector by using the vibration calculation model of the end effector; wherein the processor obtains the vibration data of the robot and the vibration data of the end effector based on the vibration which is to be reduced and which is measured by the sensor, by using an operation of the robot which causes the vibration, which is to be reduced, a provisionally set vibration calculation model of the robot, and the vibration calculation model of the end effector.

6. A vibration analysis method for analyzing, by a controller comprising a processor and a memory, an effector vibration of an end effector supported by a distal end of a robot, wherein the effector vibration is actually measured by a sensor that measures the vibration, wherein a vibration calculation model of the robot is stored in the memory of the controller, the vibration analysis method comprising:
calculating, by the controller, a robot vibration of the distal end of the robot to which the end effector is not attached on the basis of operation of the robot when the vibration of the end effector is measured by the sensor and the vibration calculation model of the robot; and
determining, by performing a calculation based on the calculated robot vibration of the distal end of the robot and the effector vibration of the end effector, a vibration state of the end effector, wherein the determined vibration state shows vibration of the end effector caused by the calculated robot vibration of the distal end of the robot that is measured by the sensor.

7. A vibration analysis method for analyzing, by a controller comprising a processor and a memory, a robot vibration of a distal end of a robot, wherein the robot vibration is actually measured by a sensor that measures the vibration of the distal end, and the robot is provided with an end effector, a vibration calculation model of the robot is stored in the memory of the controller, the vibration analysis method comprising:
calculating an effector vibration of the end effector by using the robot vibration that is measured by the sensor and the vibration calculation model of the end effector;
calculating a vibration input that is input into the distal end of the robot from the end effector by the effector vibration of the end effector, treating the robot vibration of the distal end of the robot as vibration affected by the effector vibration of the end effector; and
calculating a vibration of the distal end of the robot to which the end effector is not attached by using the calculated vibration input.

* * * * *